July 14, 1931.  R. HOFSTETTER  1,813,926

CLUTCH AND SPEED REDUCING MECHANISM

Filed Dec. 10, 1928

Inventor
Robert Hofstetter
By H.A. Tatham Att'y

Patented July 14, 1931

1,813,926

UNITED STATES PATENT OFFICE

ROBERT HOFSTETTER, OF DOWNERS GROVE, ILLINOIS, ASSIGNOR TO WESTERN ELECTRIC COMPANY, INCORPORATED, OF NEW YORK, N. Y., A CORPORATION OF NEW YORK

CLUTCH AND SPEED REDUCING MECHANISM

Application filed December 10, 1928. Serial No. 324,876.

This invention relates to clutch and speed reducing mechanisms, and more particularly to a roller drive clutch and speed reducing mechanism.

The object of this invention is to provide a simple, and efficient clutch and speed reducing mechanism for use on machine tools and the like.

In accordance with the general features of the invention, there is provided a plurality of circularly positioned tapered rollers which are adapted to engage a tapered portion of a driving shaft. A cylindrical cup shaped member connected to a shaft to be driven is provided with an inner conical surface which is also adapted to engage the tapered rollers. This conical surface surrounds the tapered surface of the driving shaft and means are provided for moving the rollers into engagement with the two surfaces to drive the second shaft. A frame supporting the rollers permits them to rotate only about their own axes.

Figure 1:
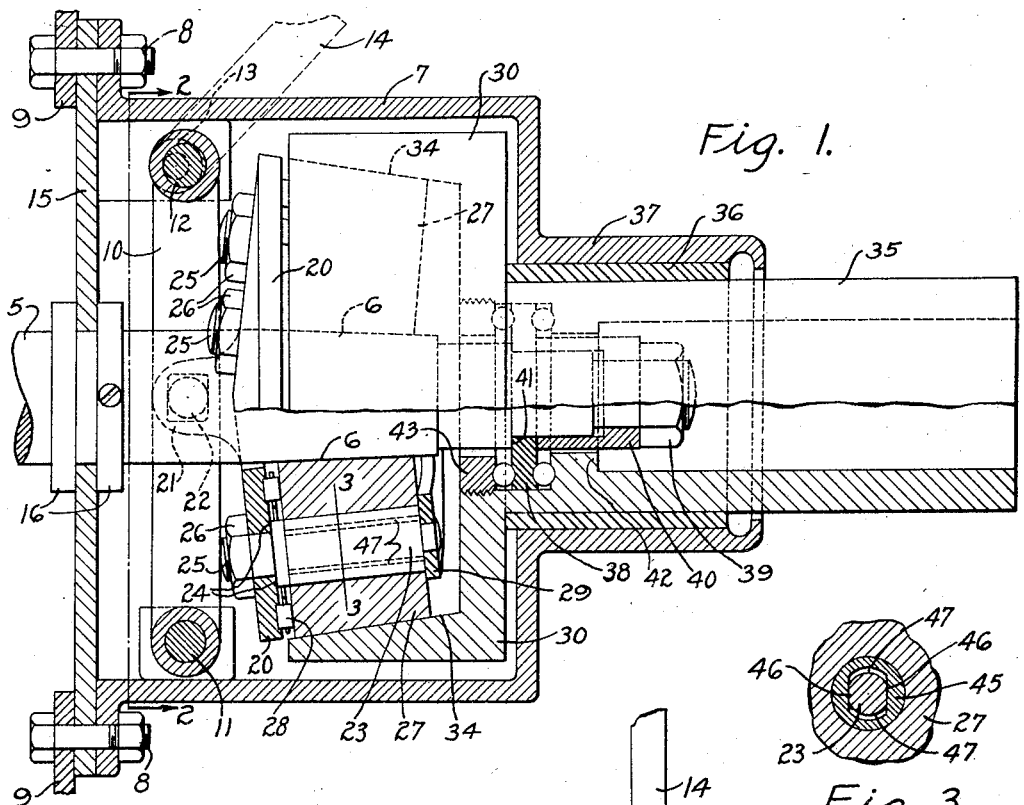
Figure 3:
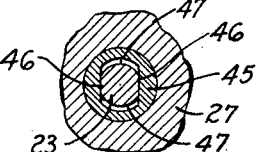
Figure 2:
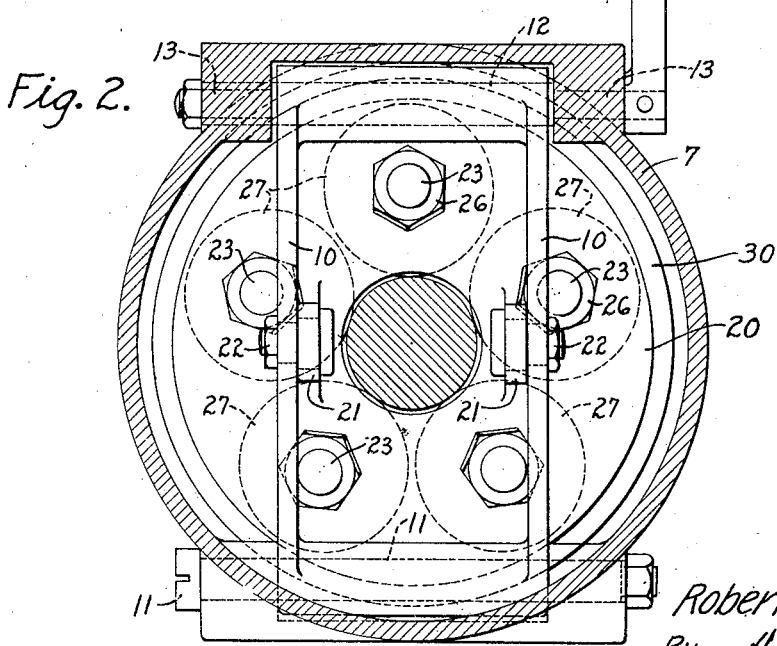

Other features and advantages of the invention will appear from the following description taken in connection with the accompanying drawings, wherein Fig. 1 is a longitudinal sectional view of the apparatus embodying the features of the invention;

Fig. 2 is a cross sectional view of the apparatus taken on the line 2—2 of Fig. 1, and Fig. 3 is an enlarged detail view of the apparatus taken on the line 3—3 of Fig. 1.

Referring now to the drawings in which like numerals designate similar parts throughout the various figures, there is disclosed the end of a driving shaft 5 which may be driven by any ordinary driving means, such as a motor. This shaft is provided with a tapered end portion 6, and surrounding this end portion there is provided a stationary cylindrical housing 7 which is secured by bolts 8 to brackets 9 which extend from the framework of the driving means for the shaft 5. Within the housing 7 there is provided an upright rectangular-shaped lever 10 which surrounds the shaft 5 (see Fig. 2), and is pivoted below to the housing 7 by a bolt 11. This lever is rotated a slight amount about the pivot bolt 11 by an eccentric arrangement connected to the upper end of the lever which consists of a shaft 12 journalled within the lever 10 and having offset end portions 13 which are journalled within the housing 7. A suitable handle 14 is secured to one of the end portions 13 for rotating the eccentric shaft 12 and actuating the lever 10. The end of the housing 7 is enclosed by a shield 15 which is held in position by the bolts 8 and extends down between collars 16 secured to the driving shaft 5.

Surrounding the shaft 5 there is provided an annular bevel-shaped disk 20 which has two central lugs 21 that are pivotally connected to the center of the rectangular upright lever 10 by means of bolts 22. A plurality of circularly positioned studs 23 each provided with shoulders 24 (Fig. 1), and threaded ends 25, are bolted by nuts 26 to this bevel-shaped disk 20, and each of these studs supports a tapered roller 27 which engages the tapered portion 6 of the driving shaft 5 when the lever 10 is in the position shown in Fig. 1. These tapered surfaces of the rollers and the driving shaft 5, it is to be understood, are designed so that if they were extended they would meet in a common apex in accordance with the theory of design of tapered roller bearings, in order that the rollers 27 and the driving member 6 properly rotate while in engagement with each other.

A thrust bearing 28 is interposed between each tapered roller 27 and the disk 20 for the purpose of sustaining the thrust between these two members, and the tapered rollers 27 are prevented from moving off the right hand end (Fig. 1) of the studs 23 by a ring 29 which is riveted thereto.

Surrounding the tapered rollers 27 there is provided a cylindrical cup shaped member 30 which has a conical surface 34 which is tapered in accordance with the theory of tapered roller bearing design mentioned above and which engages the rollers 27 when they are in the position shown in Fig. 1. This cylindrical member 30 forms an integral part of a hollow shaft 35 which it is desired to drive by means of the invented structure. The shaft 35 is journalled in a sleeve bearing 36 mounted in a diminished end portion 37 of the housing 7, and is prevented from moving longitudinally by a thrust bearing 38 which is secured to the end of the shaft 5. The bearing 38 is held in position on the shaft 5 by a nut 39 which bears against a sleeve 40 which secures the bearing 38 against a shoulder 41 on the shaft. A collar 42 integral with the shaft 35 bears against one side of the thrust bearing 38 and a disk 43 threaded to the shaft 35 bears against the other side of the thrust bearing 38, thus securing the shaft 35 to the thrust bearing 38. Of course, the shaft 35 need not be journalled in the manner described, the only necessary requisite in the mounting of the shaft being that it be prevented from moving longitudinally in order that the conical surface 34 be always in a fixed position for engaging the rollers 27. Thus, there is described above a simple clutch device whose operation will now be explained.

When the rollers 27 are in the position shown in the drawings, they are engaged by the tapered surface 6 of the driving shaft 5 and rotated about their individual axes on the studs 23 which are secured to a non-rotatable disk 20 which is mounted on the lever 10. While in this position the rollers 27 also engage the conical surface 34 of the shaft 35 and produce rotation of the shaft 35. Of course, the speed of rotation of the shaft 35 is reduced with respect to the speed of the rotation of shaft 5 and thus the structure serves as a speed reducer. This reduction in speed is theoretically equal to the ratio of the mean diameter of the portion of the conical surface 34 engaged by the rollers 27 to the mean diameter of the portion of the tapered surface 6 engaged by the rollers 27, because both of these engaged surfaces move the same peripheral distance, but the proportion of this distance to the circumference of each engaged surface depends upon the diameter of that surface.

When it is desired to stop the shaft 35, the handle 14 is rotated counter-clockwise (Fig. 1), actuating the eccentric 12, and moving the lever 10, the disk 20, and the studs 23 to the left (Fig. 1), and consequently the rollers 27 out of engagement with the surfaces 6 and 34. When it is desired to again rotate the shaft 35, the handle 14 is rotated in a clockwise direction back to the position shown in Fig. 1, and this actuates the eccentric 12 and moves the lever 10 to the right, and consequently the rollers 27 into engagement with the surfaces 6 and 34 and causes the shaft 35 to rotate.

In order that the tapered rollers 27 may be moved longitudinally of the shaft 5 and out of and into engagement with the surfaces 6 and 34, as described, the rollers are given a slight radial play on the studs 23. This play is provided (as shown in Fig. 3) by mounting the rollers on bushings 45 which are provided with flattened surfaces 46 that cooperate with corresponding flattened surfaces on the studs 23. Play spaces 47 are left above and below the stud 23, and thus the flattened surfaces 46 may move up and down over the stud 23. The studs 23 are so mounted on the disk 20 that the flattened surfaces 46 are disposed radially of the shaft 5, and thus it is apparent that the rollers 27 may move radially to the extent provided by the play spaces 47 to provide for their longitudinal movement. When the rollers 27 are engaging the surfaces 6 and 34 as shown in Fig. 1, the studs 23 are disposed centrally of the bushings 45 and thus the rollers may rotate properly.

It is believed to be apparent that the above described apparatus provides a simple and efficient clutch and speed reducing mechanism, but it is to be understood that the invention is not limited to the specific structure here illustrated and described, but is limited only by the scope of the appended claims.

What is claimed is:

1. In a clutch, a tapered driving shaft, a shaft driven thereby, a member provided with a conical surface connected to the driven shaft and surrounding the driving shaft, a plurality of tapered rollers with their axes inclined with respect to the axes of the shafts and adapted to be moved into and out of engagement with the tapered driving shaft and the conical surface, and means for moving the tapered rollers into and out of engagement with the tapered driving shaft and conical surface to actuate the driven shaft.

2. In a clutch, a tapered driving shaft, a shaft driven thereby, a cup shaped member connected to the driven shaft and surrounding the driving shaft, a plurality of tapered rollers adapted to be moved into and out of engagement with the tapered driving shaft and the cup shaped member to actuate the driven shaft, and a non-rotatable bevel-shaped support for mounting the rollers with their axes inclined with respect to the axes of the shafts and for moving them into and out of the aforesaid engagement.

3. In a clutch, a tapered driving shaft, a shaft driven thereby, a member provided with a conical surface connected to the driven shaft and surrounding the driving shaft, a plurality of longitudinally movable tapered rollers for engaging the tapered driving shaft and the conical surface, thrust bearings for longitudinally moving the tapered rollers into engagement with the tapered driving shaft and the conical surface to actuate the driven shaft, and floating bushings for providing a slight radial movement of the rollers so they may be thus moved longitudinally.

4. In a clutch, a tapered driving shaft, a tapered driven shaft adjacent thereto, a plurality of tapered rollers disposed adjacent to the two shafts, floating bushings for adjustably supporting the rollers, thrust bearings for longitudinally moving the rollers into engagement with the two shafts to actuate the driven shaft, pivoted means for mounting the rollers and the bushings and for actuating the thrust bearings, and an eccentric for operating the pivoted means.

5. In a clutch, a driving shaft having a tapered end portion, a shaft driven thereby having an integral conical portion surrounding the tapered portion of the driving shaft, a thrust bearing secured to the driving shaft for preventing longitudinal movement of the driven shaft, tapered rollers with their axes disposed at an angle to the axes of the driving and driven shafts, thrust bearings for moving the tapered rollers into engagement with the tapered portion of the driving shaft and the conical portion of the driven shaft, and pivoted means for mounting the rollers and operating the thrust bearings thereof.

In witness whereof, I hereunto subscribe my name this 27 day of November, A. D. 1928.

ROBERT HOFSTETTER.